United States Patent
Papakipos et al.

(10) Patent No.: US 9,369,983 B2
(45) Date of Patent: *Jun. 14, 2016

(54) STATISTICS FOR CONTINUOUS LOCATION TRACKING

(71) Applicant: Facebook, Inc., Menlo Park, CA (US)

(72) Inventors: Matthew Nicholas Papakipos, Palo Alto, CA (US); David Harry Garcia, Sunnyvale, CA (US); Ross David Bayer, Mountain View, CA (US); Nicholas Felton, Brooklyn, NY (US); Justin Alexander Shaffer, San Francisco, CA (US)

(73) Assignee: Facebook, Inc., Menlo Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/492,710

(22) Filed: Sep. 22, 2014

(65) Prior Publication Data

US 2015/0011241 A1  Jan. 8, 2015

Related U.S. Application Data

(63) Continuation of application No. 13/354,804, filed on Jan. 20, 2012, now Pat. No. 8,880,093.

(51) Int. Cl.
| | | |
|---|---|---|
| *H04W 24/00* | (2009.01) | |
| *H04W 64/00* | (2009.01) | |
| *H04W 24/04* | (2009.01) | |
| *H04L 12/18* | (2006.01) | |
| *H04L 29/08* | (2006.01) | |
| *H04W 24/08* | (2009.01) | |
| *H04W 4/02* | (2009.01) | |

(52) U.S. Cl.
CPC ............ *H04W 64/00* (2013.01); *H04L 12/1813* (2013.01); *H04L 67/22* (2013.01); *H04W 4/028* (2013.01); *H04W 24/04* (2013.01); *H04W 4/02* (2013.01); *H04W 24/08* (2013.01)

(58) Field of Classification Search
None
See application file for complete search history.

(56) References Cited

U.S. PATENT DOCUMENTS

| | | | |
|---|---|---|---|
| 8,751,427 B1* | 6/2014 | Mysen et al. | 706/46 |
| 2008/0306826 A1* | 12/2008 | Kramer et al. | 705/14 |
| 2009/0073033 A1* | 3/2009 | Price | G06Q 30/02 342/357.34 |
| 2011/0276565 A1* | 11/2011 | Zheng et al. | 707/724 |
| 2012/0264446 A1* | 10/2012 | Xie et al. | 455/456.1 |
| 2013/0035114 A1* | 2/2013 | Holden et al. | 455/456.3 |
| 2013/0058274 A1* | 3/2013 | Scherzer et al. | 370/328 |

FOREIGN PATENT DOCUMENTS

CN  WO 2012/129771  * 4/2012 ............ H04W 4/04

* cited by examiner

*Primary Examiner* — Suhail Khan
(74) *Attorney, Agent, or Firm* — Baker Botts L.L.P.

(57) ABSTRACT

In one embodiment, one or more computing devices receive, from one or more mobile devices respectively associated with one or more users, one or more sets of data, wherein each set of data comprises: a user identifier indicating to which user the set of data corresponds; a location where the corresponding user was at; and a time when the corresponding user was at the location. The computing devices store the one or more sets of data; and extract one or more statistics from the one or more sets of data that represent behavioral pattern of at least one of the one or more users.

14 Claims, 3 Drawing Sheets

STATISTICS FOR CONTINUOUS LOCATION TRACKING

PRIORITY

This application is a continuation under 35 U.S.C. §120 of U.S. patent application Ser. No. 13/354,804, filed 20 Jan. 2012.

TECHNICAL FIELD

This disclosure generally relates to continuously tracking the locations of mobile devices as they are carried by their users. It further relates to analyzing and mining the collected location information to extract statistics that represent user behavioral patterns.

BACKGROUND

Mobile devices, such as mobile telephones, tablet computers, netbook computers, personal digital assistants, and portable game consoles, have become prevalent in this digital age. Each new generation of mobile devices is more powerful, more sophisticated, more user friendly, and even more fashionable. People increasingly rely on these mobile devices, so much so that they have become an integral part of people's daily lives.

DESCRIPTION OF EXAMPLE EMBODIMENTS

Figure 1:
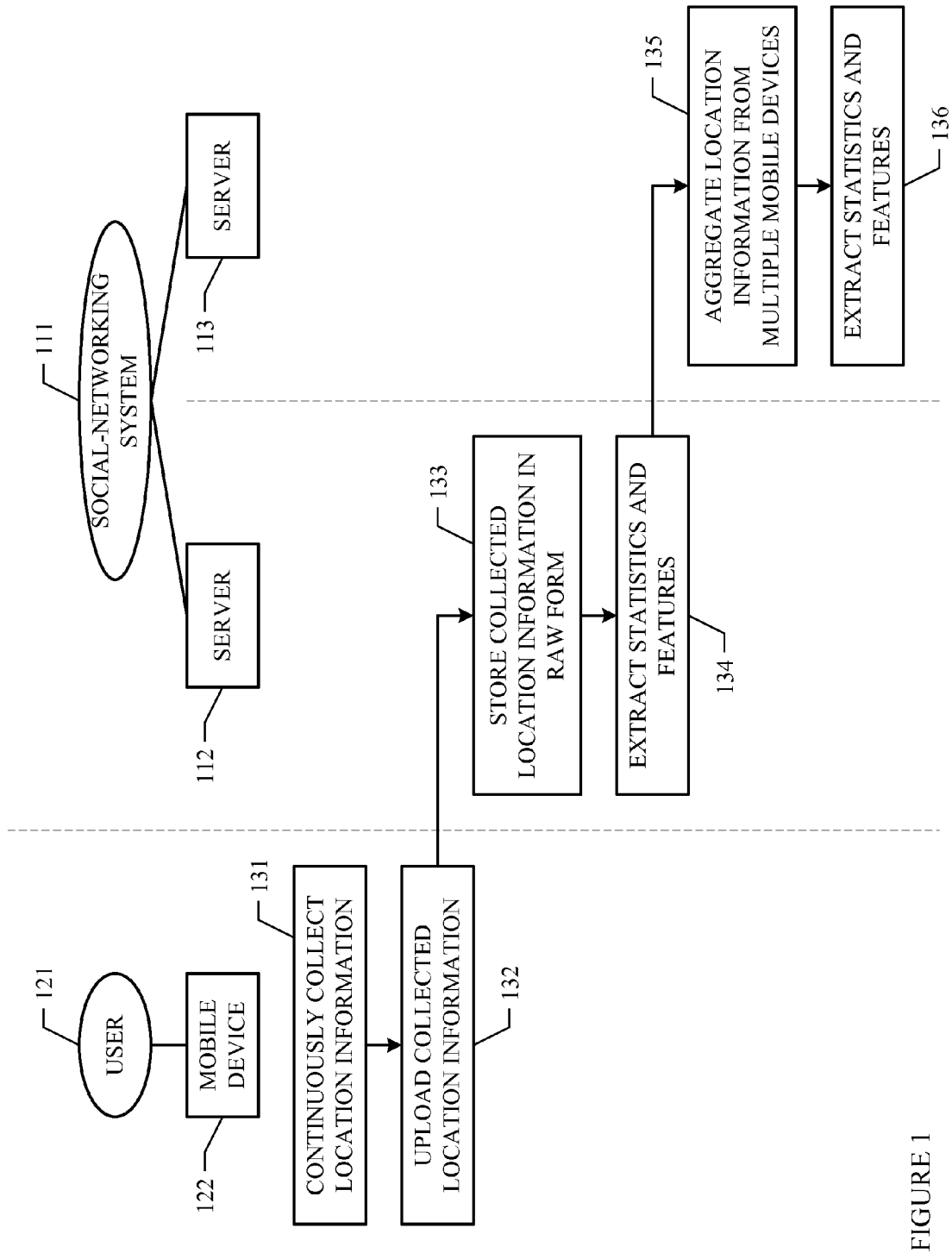
FIG. 1 illustrates an example method of continuously collecting location information from a mobile device and analyze the collected information to extract statistics that correlate to the behaviors of a user of the mobile device.

In particular embodiments, a mobile device includes a location sensor and an acceleration sensor. The location and acceleration or speed of the mobile device are continuously tracked as it is carried by its user based on the location and acceleration sensor readings. Consequently, the location and acceleration or speed of the mobile device user may be inferred from the location and acceleration or speed information of the mobile device itself. Such information may be analyzed to extract statistical information that reflects the behavioral patterns of the mobile device user. In particular embodiments, the location and acceleration or speed information of multiple mobile devices, belonging to multiple users, may be continuously tracked and collected. The information, once collected, may be aggregated and analyzed to extract statistical information that reflects the behavioral patterns of a group of mobile device users.

Mobile devices are becoming increasingly sophisticated. They are more powerful and support more functionalities. For example, a smart mobile telephone is no longer limited to enabling its user to make telephone calls and text messages. Instead, the user can use the mobile telephone to, for example, take photographs, upload files, check stock prices, conduct banking transactions, surf the web, get driving directions, read electronic books, draft documents, and so on. Often, mobile devices include hardware and software components that help implement these functionalities.

In particular embodiments, a mobile device (e.g., a mobile telephone) includes a location sensor that is capable of determining its current location at a given time. In some implementations, the location sensor may be a Global Positioning System (GPS) sensor, which is capable of providing the GPS coordinates of its current location at a given time. In particular embodiments, the mobile device further includes an acceleration sensor that is capable of determining its current acceleration at a given time. In some implementations, the acceleration sensor may be an accelerometer, which is capable of measuring its current acceleration at a given time. The location sensor may be employed to determine the current location of the mobile device at a given time, while the acceleration sensor may be employed to determine the current acceleration of the mobile device at a given time. In addition, the current speed of the mobile device at a given time may be inferred based on the location or acceleration sensor readings. As an example, the locations of the mobile device may be tracked over a period of time based on the GPS coordinates provided by the location sensor. This information, together with other optional sensor readings, may be used to infer the speed of the mobile device moving around these locations during the period of time. As another example, the accelerations of the mobile device may be tracked over a period of time based on the acceleration sensor readings. The acceleration data may be numerically integrated over time (i.e., adding them up over time) to infer the speed of the mobile device over the period of time.

As the mobile device is carried by its user and thus moves with its user over time, the location of the mobile device may be continuously tracked based on the location sensor readings. Optionally, the acceleration of the mobile device may be continuously tracked as well based on the acceleration sensor readings. In addition, the speed of the mobile device over time may be inferred from location or acceleration sensor readings. In particular embodiments, the location and acceleration or speed information of the mobile device may be continuously collected. Since the mobile device is carried by and moves with its user, the location and acceleration or speed information of the mobile device user may be inferred from the location and acceleration or speed information of the mobile device itself. For example, as a user performs his daily activities (e.g., exercise, work, leisure, etc.) while carrying his mobile telephone with him, the location and acceleration sensors on the mobile telephone may take readings periodically (e.g., once every few seconds or once every minute). These sensor readings reflect the mobile telephone's and thus the user's location and acceleration or speed over time.

FIG. 1 illustrates an example method of continuously collecting location information from a mobile device and analyze the collected information to extract statistics that correlate to the behaviors of a user of the mobile device. Suppose that a mobile device 122 (e.g., a mobile telephone) is associated with a user 121. Usually, as user 121 goes through his daily life, he carries mobile device 122 with him.

In particular embodiments, mobile device 122 includes a location sensor. Mobile device 122 continuously determines its current location as time passes (as illustrated in STEP 131). In some implementations, there is a software application residing on mobile device 122. While this software application is running, it directs the location sensor to take readings periodically (e.g., once every few seconds or once every few minutes). Alternatively, in some implementations, there may be a software module included in the operating system of mobile device 122, which directs the location sensor to take readings periodically. For example, each specific location may be represented as a set of GPS coordinates or a pair of latitude and longitude. Each location is also associated with a timestamp, which indicates when the location sensor reading is taken. Thus, the readings show where mobile device 122 is at what time.

In particular embodiments, mobile device 122 further includes an acceleration sensor. Mobile device 122 may continuously determine its current acceleration as time passes as well. Again, the software application or the software module in the operating system of mobile device 122 may direct the acceleration sensor to take readings periodically. For example, each specific acceleration reading may be represented as an acceleration value. Each acceleration is also associated with a timestamp, which indicates when the acceleration sensor reading is taken. Thus, the readings show how fast mobile device 122 moves at what time. In some implementations, the acceleration sensor and the location sensor are directed to take their respective readings at about the same time, so that at a given time, the collected sensor data show where mobile device 122 is as well as how fast mobile device 122 moves. The speed of the mobile device over time may be inferred from the location or sensor readings.

In some implementations, the software application or module automatically begins executing upon mobile device 122 being turned on and continues executing while mobile device 122 remains on. Thus, as long as mobile device 122 is turned on, it continuously collects its location and acceleration information. However, to protect user privacy, in some implementations, user 121 is given the option of shutting down the software application or module whenever he desires, or preventing the software application or module from starting automatically. User 121 nevertheless has the option of starting the software application or module manually whenever he prefers. This allows user 121 to control when his mobile device 122 should collect the information and for how long.

In particular embodiments, the collected location and optionally, acceleration information is temporarily stored on mobile device 122 and uploaded to a server 112 for further processing and analysis as appropriate (as illustrated in STEP 132). In some implementations, the location and acceleration information is uploaded as soon as it becomes available (e.g., as soon as the sensors take their respective readings). However, since in practice, the sensors may take their readings very frequently (e.g., once every few seconds or minutes), this may result in high communication traffic and negatively affect mobile device's 122 performance. In addition, mobile device 122 may not be connected to a network at all times. Thus, in some implementations, the information upload may be performed at appropriate intervals. For example, the upload may be performed once an hour, or a upload is performed when a certain amount of data (e.g., 1 MB) has been accumulated. If mobile device 122 is disconnected from all networks for some period of time, a special upload may be performed when mobile device 122 is reconnected to a network to upload the data accumulated during that time period.

In particular embodiments, server 112 may be associated with a social-networking system 111. A social network, in general, is a social structure made up of entities, such as individuals or organizations, that are connected by one or more types of interdependency or relationships, such as friendship, kinship, common interest, financial exchange, dislike, or relationships of beliefs, knowledge, or prestige. In more recent years, social networks have taken advantage of the Internet. There are social-networking systems existing on the Internet in the form of social-networking websites. Such social-networking websites enable their members, who are commonly referred to as website users, to perform various social activities. For example, the social-networking website operated by Facebook, Inc. at www.facebook.com enables its users to communicate with their friends via emails, instant messages, or blog postings, organize social events, share photos, receive news of their friends or interesting events, play games, etc.

In particular embodiments, user 121 may be a member of social-networking system 111, and thus has a user account with social-networking system 111. User 121 may link mobile device 122 to his account with social-networking system 111 so that server 112 is aware that mobile device 122 is associated with user 121. In addition, in particular embodiments, mobile device 122 may be supplied or sponsored by social-networking system 111 and may include software applications specifically designed to work with servers (e.g., server 112) associated with social-networking system 111. For example, mobile device 122 may send its location and acceleration information as communication packets that each have a predetermined format so that server 112 can interpret the data in the packets. In addition, mobile device 122 may have been given the network destination of server 122 so that it knows where to send its location and acceleration information. In particular embodiments, each packet may also include a device identifier (ID) of mobile device 122 (e.g., its serial number) so that server 112 is able to determine which mobile device has sent a specific packet. From this information, server 112 is able to determine to which user the location and acceleration information in the packet relates (e.g., based on the information provided in the user accounts). Alternatively, in particular embodiments, each packet may include the user ID of user 121 with social-networking system 111 so that server 112 is able to determine to which user the location and acceleration information in the packet relates.

In particular embodiments, upon receiving the location and acceleration information from mobile device 122, server 112 stores the information, such as in a datastore (as illustrated in STEP 133). In some implementations, the information is stored in its raw form, such that there is an entry corresponding to each set of location and acceleration readings collected and sent by mobile device 122. In other words, the information received from mobile device 122 is not aggregated. The following is an example of storing location and acceleration information in its raw form:

| user ID | timestamp | location (latitude, longitude) | acceleration (m/s$^2$) |
|---|---|---|---|
| smith5928 | 2011-10-26 10:00:00 | 37° 49', 8" N 122° 28' 41" W | 5 |
| smith5928 | 2011-10-26 10:05:00 | 37° 49' 9" N 122° 29' 39" W | 3 |
| smith5928 | 2011-10-26 10:10:00 | 37° 49' 9" N 122° 29' 39" W | 0 |
| ... | ... | ... | ... |

In some implementations, upon receiving the location and acceleration information from mobile device 122, server 112 may infer the speed information of mobile device 122 from the received location or acceleration information. In some cases, instead of storing the acceleration readings received from mobile device 122, the inferred speed information about mobile device 122 is stored, in addition to the location readings. In other cases, both the acceleration readings and the inferred speed information about mobile device 122 are stored, again in addition to the location readings.

In particular embodiments, server 112 may process and analyze the location and speed information collected and inferred over time to extract statistics that suggest behavioral patters of user 121 (as illustrated in STEP 134). Different types of statistics may be extracted and this disclosure contemplates any application type of statistics. Social-networking system 111 may then use these statistics to serve its users, such as making recommendations. In particular embodiments, the statistics may be cached so that the information is more readily available.

As an example, based on the location entries and their associated timestamps, server 112 may determine how much time user 121 spends at work each day. Over time, the statistics may show how much time user 121 spends at work, either on average or in total, during a day, a week, a month, or a year. Similarly, if user 121 frequents a local restaurant, those location entries showing user 121 at the restaurant and their associated timestamps may show how much time user 121 spends at the restaurant during a specific week, month, or year. Thus, the statistics may show how much time user 121 spends at a specific place (e.g., work, home, restaurant, shop, etc.), either on average or in total, during a day, week, month, or year.

As another example, the acceleration or speed entries and their associated timestamps may suggest how much time user 121 walks or runs each day. A person usually walks at a speed between 3 to 4 miles per hour. Thus, those speed entries showing mobile device 122 moving at approximately such speed range may suggest that user 121 had been walking during the associated time periods. Similarly, a person usually runs at a speed between 5 to 7 miles per hour. Again, those speed entries showing mobile device 122 moving at approximately such speed range may suggest that user 121 had been running during the associated time periods. Over time, the statistics may show how much time user 121 spends exercising (e.g., walking or running), either on average or in total, during a day, a week, a month, or a year. Thus, the statistics may show how much time user 121 spends doing an activity, either on average or in total, during a day, week, month, or year. For example, if the statistics indicate that user 121 exercises less than 4 hours per week, social-networking system 111 may notify user 121 and recommend that user 121 should spend more time exercising. Similarly, when mobile device 122 is stationary (e.g., the speed is 0) and the associated timestamps indicate that it is at night, it may be inferred that user 121 is asleep. Over time, the statistics may show how long, on average, user 121 sleeps each night. For example, if the statistics indicate that user 121 usually sleeps less than 5 hours each night, social-networking system 111 may notify user 121 and recommend that user 121 should sleep more.

As a third example, if someone else is looking for user 121, she may query server 112 for user's 121 last known location. Server 112 may look up the last location entry received from mobile device 122 and its associated timestamp to determine the last known location for user 121 and how recently user 121 had been at that location. This may be useful when a parent wishes to know the last known location of her minor child (e.g., user 121). In addition, the parent may track her minor child's movements or whereabouts over time through location information received from a mobile device (e.g., mobile device 122) carried by her minor child. This may be very valuable information to the parent, especially during an emergency.

As a fourth example, suppose that user 121 lives and works in San Francisco. However, during a two-week period, the location entries show that mobile device 122 is in New York City. These entries may suggest that user 121 is traveling during those two weeks. Again, over time, the statistics may show how much time user 121 spends traveling and where user 121 travels to.

Social-networking system 111 may have many users each having at least one mobile device. In particular embodiments, each mobile device may continuously collect its own location and acceleration information and upload the information to server 112. The speed information of the mobile device may then be inferred from the location or acceleration information. Over time, server 112 may correlate the information about multiple users to exact statistics relating groups of users.

Figure 2:
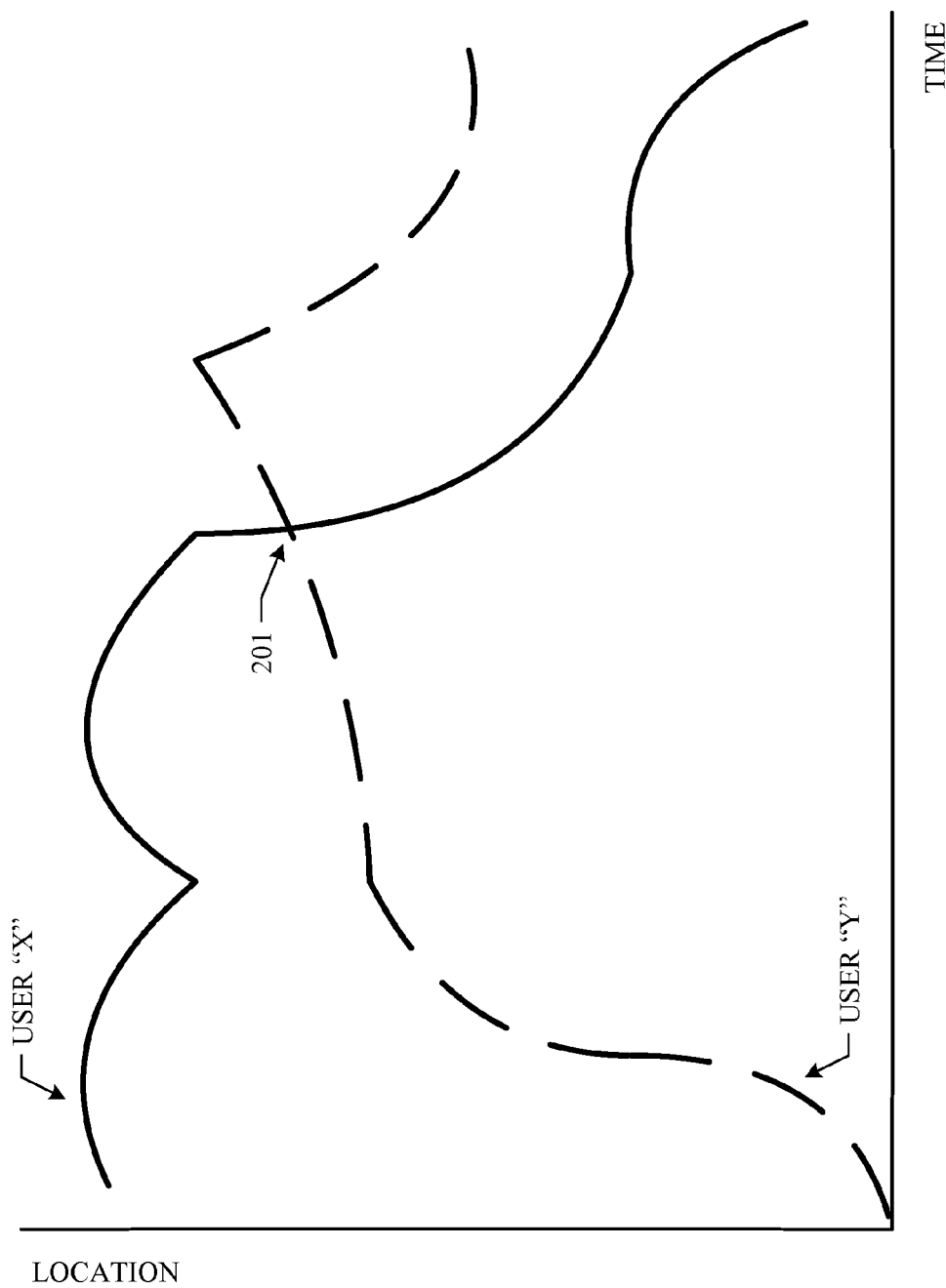
FIG. 2 illustrates an example of plotting locations against time for two users.

In some implementations, for each user, his locations collected over time through an associated mobile device may be plotted against time. FIG. 2 illustrates an example of plotting locations against time for two users, "X" and "Y". Each point along a curve is a specific location and its associated timestamp, as tracked by a corresponding mobile device associated with a corresponding user. According to FIG. 2, the two curves, corresponding to users "X" and "Y" respectively, coincide at point 201. This indicates that users "X" and "Y" had been at the same location at the same time corresponding to point 201. Such curves may help track the movements or whereabouts of individual users over time and determine statistics for groups of users.

As an example, if the location entries of multiple users indicate that many users spend time at a specific sports bar, this may suggest that this sports bar is popular among this group of users. By examining the information provided in these users' accounts with social-networking system 111, it may be determined that, for example, the sports bar is especially popular among those users between the ages of 25 and 30. If there is another user who is 28 years old and lives nearby, but who has never visited the sports bar, social-networking system 111 may suggest the sports bar to that user. Similarly, the location entries of multiple users may help infer facts such as, popular vacation destinations that many users have visited or popular activities that many users have participated. Social-networking system 111 may suggest such information to other users.

In particular embodiments, social-networking system 111 may categorize its users based on common user characteristics, such as age (e.g., users between the ages of 20 and 30), genders (e.g., male users vs. female users), family status (e.g., single users, married users, divorced users, users with children), profession (e.g., engineers, accountants, doctors), geographical location (e.g., northern California, central California, southern California), and so on. Statistics may be determined for a particular category of users. For example, for a group of female users between the ages of 30 and 40 who live in the San Francisco Bay Area, their corresponding location and acceleration or speed information may indicate which locations (e.g., restaurants, shops, clubs, parks) or which activities (e.g., hiking, cycling, shopping) are popular among this particular group of users. These may be locations that a majority (e.g., more than 50% or 75%) of the users in the group have been to or activities that a majority of the users in the group have participated in. Social-networking system 111 may make recommendations to other users sharing similar characteristics.

As another example, suppose that given three users, "X", "Y", and "Z", their respective location entries have many matching points (e.g., they are often at the same location at the same time). This may suggest that users "X", "Y", and "Z" know each other well and often spend time together. Moreover, if within social-networking system 111, users "X", "Y", and "Z" also have established "friend" connections with each other, it is a further indication that users "X", "Y", and "Z" probably are good friends. Based on such information, server 112 may determine that, for example, user "X" often socializes (e.g., hang out with) users "Y" and "Z". Suppose that on a particular Saturday afternoon, users "Y" and "Z" are at a club frequented by users "X", "Y" and "Z", social-networking system 111 may send to a notification to user "X" in case he wishes to join his friends at the club.

As a third example, suppose that users "X" and "Y" have established "friend" connections with each other within social-networking system 111. On a particular Saturday afternoon, users "X" and "Y" are at two different locations that are near each other (e.g., within a few miles). Social-networking system 111 may send notifications to users "X" and "Y" to let them know that their friend is nearby in case they wish to meet up (e.g., for coffee).

In particular embodiments, the location and acceleration or speed entries of the users together may provide certain statistics as well. As an example, the speed entries of a user may suggest that the user is running at certain times, while the corresponding location entries of the user may indicate where the user is running Based on such entries of a group of users living in the same area (e.g., the San Francisco Bay Area), server 112 may determine where people living in that area like to go running (e.g., the popular running places in the San Francisco Bay Area). Suppose that a user has recently moved to the area and the user has indicated to social-networking system 111 that one of his hobbies is running, social-networking system 111 may recommend the popular running places in the area to the user.

As described above, server 112 stores the location and acceleration or speed information received from mobile devices associated with users in its raw form. Since there may be millions of users each having hundreds of entries per day, the amount of data can grow rapidly over time. In addition, there is the concern with user privacy protection. In particular embodiments, older data are transferred to another server 113 to be stored in aggregated form. In some implementations, after the data have been stored with server 112 in raw form for a time period (e.g., 3 to 5 years), the data are transferred to server 113, which may also be associated with social-networking system 111. Server 113 aggregates the data and stores them in the aggregated form (as illustrated in STEP 135). Server 113 may filter the data as well so that only the more interesting data are stored. Typically, people are more interested in and concerned with what they do or where they are in recent times instead of what had taken place several years ago. In particular embodiments, server 113 may extract features that describe users' behavioral patterns from the raw data and store these features (as illustrated in STEP 136).

As an example, suppose that a user typically spends 9 hours per day and 5 days per week at work. While the user is in his office working, his mobile device mostly remains at the same location (e.g., also in the user's office with the user, such as sitting on top of the user's desk). Nevertheless, the mobile device continuously takes location and acceleration sensor readings (e.g., once every 5 minutes) and sends the location and acceleration data to server 112. During each 9-hour period that the user spends at work, the sensor readings are approximately the same (e.g., approximately the same location and same acceleration) and yet, there may be 108 sets of data (e.g., timestamp, location, acceleration) collected and stored in raw form, which are repetitive and do not provide additional information about the user. Thus, server 113 may aggregate such data. Instead of storing 108 sets of raw data for each 9-hour period, server 113 may store data describing the actual time the user spends at work each day. In this case, server 113 extracts the relevant features (e.g., the time the user spends at work each day) from the raw data and stores the features instead (e.g., storing the data in feature form). Similarly, sever 113 may determine how much time the user spends sleeping, exercising, and at leisure each day, how often the user visits a particular restaurant, how much time the user spends with his friends, and so on, and store these features that describe the user's behavioral patterns instead of the raw data themselves. Suppose that a user wishes to know whether he has improved his lifestyle and health by exercising more. The user may query sever 113 for the amount of time he had spent exercising each week 3 years ago, and compare it to the amount of time he spends exercising each week now.

In particular embodiments, servers 112 and 113 may each be a unitary server or may be a distributed server spanning multiple computers or multiple datacenters. Servers 112 and 113 may each include hardware, software, or embedded logic components or a combination of two or more such components for carrying out the appropriate functionalities implemented or supported by servers 112 and 113, respectively. For example, social-networking system 111, implementing a social-networking website, may be hosted on servers 112 and 113.

Figure 3:
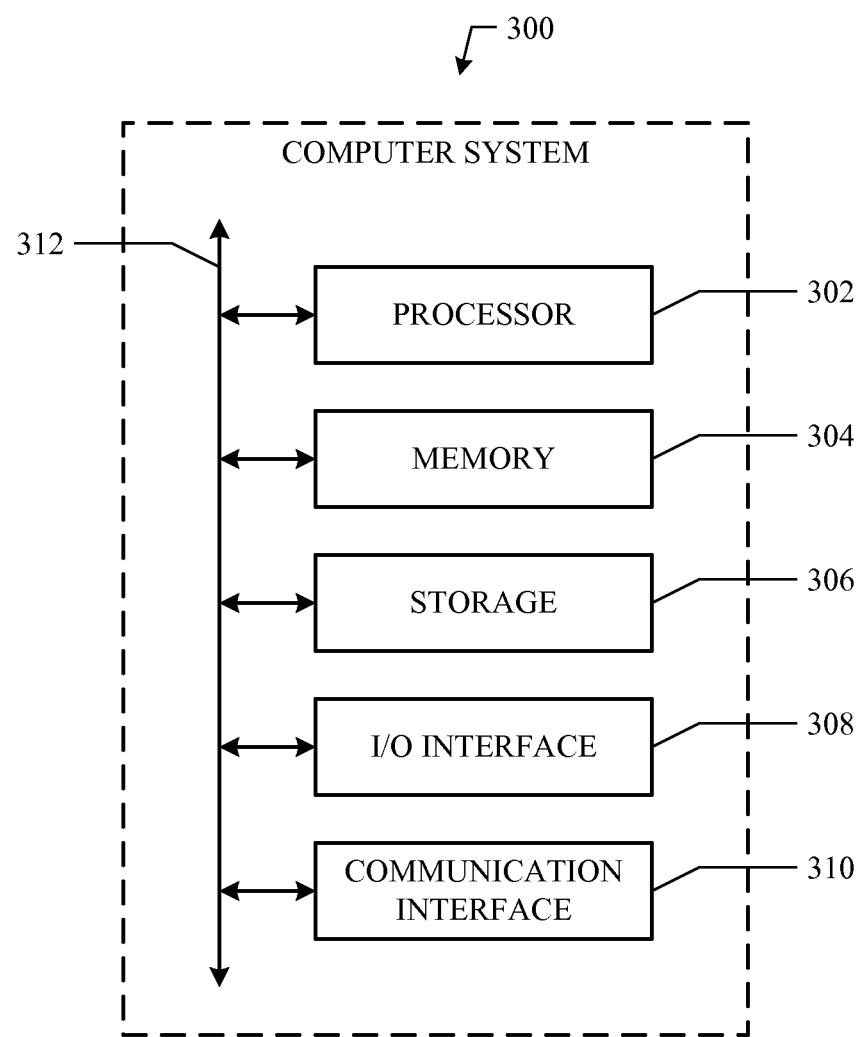
FIG. 3 illustrates an example computer system.

Particular embodiments may be implemented on one or more computer systems. FIG. 3 illustrates an example computer system 300. For example, servers 112 and 113 may each be implemented as computer system 300. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 300 may include one or more computer systems 300; be unitary or distributed; span multiple locations; span multiple machines; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include an HDD, a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 302 (such as, for example, one or more internal registers or caches), one or more portions of memory 304, one or more portions of storage 306, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA, C, or C++. In particular embodiments, software is expressed in Hyper Text Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
by one or more computing devices, receiving, from each of a plurality of mobile computing devices associated with a plurality of users, a plurality of data sets that each comprise data identifying:
the user that the data set corresponds to;
one or more locations where the user was or is at;
an acceleration or speed associated with the user, and
for each of the locations, a corresponding time when the user was or is at the location;
by one or more computing devices, for a first user from the plurality of users, identifying one or more second users of the plurality of users, wherein:
each of the second users have a social-networking connection with the first user; and
a data set corresponding to each of the second users and a data set corresponding to the first user share:
one or more previous common locations; and
for each of the previous common locations, a common time when both the second user and the first user were at the common location;
by one or more computing devices, generating one or more statistics based at least in part on the data sets corresponding to the second users, wherein the statistics represent behavioral patterns of the second users, and one or more of the behavioral patterns comprises an inferred activity of the second users based at least in part on the accelerations or the speeds;

by one or more computing devices, generating a recommendation for a current time for the first user based at least in part on one or more of the statistics, wherein:
   the recommendation comprises one or more activities at a particular location where at least one of the second users is located at the current time;
   the recommendation corresponds to the inferred activity of the second users; and
   the first user is not associated with the one or more activities at the particular location; and
by one or more computing devices, sending the recommendation to the first user.

2. The method of claim 1, further comprising inferring one or more accelerations or speeds respectively associated with one or more of the computing devices based at least in part on a plurality of the one or more locations and the corresponding times.

3. The method of claim 1, further comprising categorizing the second users based at least in part on demographic information of the second users, wherein:
   one or more of the statistics are generated based at least in part on only the second users in one or more of the categories;
   the statistics represent the behavioral patterns of the second users in the one or more categories;
   the first user is in the one or more categories from which the statistics are generated; and
   the recommendation corresponds to the behavioral patterns of the second users in the one or more categories.

4. The method of claim 3, further comprising identifying the first user based at least in part on information of a social-networking profile associated with the first user, wherein the information suggests that the first user is interested in the inferred activity.

5. The method of claim 1, further comprising categorizing the second users based at least in part on
   one or more distances between the second users and the first user, wherein one or more of the statistics are generated based at least in part on only the second users within one or more particular distances of the first user.

6. A system comprising:
one or more processors; and
a memory coupled to the processors comprising instructions executable by the processors, the processors being operable when executing the instructions to:
   receive, from each of a plurality of mobile computing devices associated with a plurality of users, a plurality of data sets that each comprise data identifying:
      the user that the data set corresponds to;
      one or more locations where the user was or is at;
      an acceleration or speed associated with the user; and
      for each of the locations, a corresponding time when the user was or is at the location;
   for a first user from the plurality of users, identify one or more second users of the plurality of users, wherein:
      each of the second users have a social-networking connection with the first user; and
      a data set corresponding to each of the second users and a data set corresponding to the first user share:
         one or more previous common locations; and
         for each of the previous common locations, a common time when both the second user and the first user were at the common location;
   generate one or more statistics based at least in part on the data sets corresponding to the second users, wherein the statistics represent behavioral patterns of the second users, and one or more of the behavioral patterns comprises an inferred activity of the second users based at least in part on the accelerations or the speeds;
   generate a recommendation for a current time for the first user based at least in part on one or more of the-statistics, wherein:
      the recommendation comprises one or more activities at a particular location where at least one of the second users is located at the current time;
      the recommendation corresponds to the inferred activity of the second users; and
      the first user is not associated with the one or more activities at the particular location; and
   send the recommendation to the first user.

7. The system of claim 6, wherein the processors are further operable when executing the instructions to infer one or more accelerations or speeds respectively associated with one or more of the computing devices based at least in part on a plurality of the one or more locations and the corresponding times.

8. The system of claim 6, wherein the processors are further operable when executing the instructions to categorize the second users based at least in part on demographic information of the second users, wherein:
   one or more of the statistics are generated based at least in part on only the second users in one or more of the categories;
   the statistics represent the behavioral patterns of the second users in the one or more categories;
   the first user is in the one or more categories from which the statistics are generated; and
   the recommendation corresponds to the behavioral patterns of the second users in the one or more categories.

9. The system of claim 8, wherein the processors are further operable when executing the instructions to identify the first user based at least in part on information of a social-networking profile associated with the first user, wherein the information suggests that the first user is interested in the inferred activity.

10. The system of claim 6, wherein the processors are further operable when executing the instructions to categorize the second users based at least in part on
   one or more distances between the second users and the first user, wherein one or more of the statistics are generated based at least in part on only the second users within one or more particular distances of the first user.

11. One or more computer-readable non-transitory storage media embodying software that is operable when executed to:
   receive, from each of a plurality of mobile computing devices associated with a plurality of users, a plurality of data sets that each comprise data identifying:
      the user that the data set corresponds to;
      one or more locations where the user was or is at;
      an acceleration or speed associated with the user; and
      for each of the locations, a corresponding time when the user was or is at the location;
   for a first user from the plurality of users, identify one or more second users of the plurality of users, wherein:
      each of the second users have a social-networking connection with the-first user; and a data set corresponding to each of the second users and a data set corresponding to the first user share:
  one or more previous common locations; and
  for each of the previous common locations, a common time when both the second user and the first user were at the common location;
generate one or more statistics based at least in part on the data sets corresponding to the second users, wherein the statistics represent behavioral patterns of the second users, and one or more of the behavioral patterns comprises an inferred activity of the second users based at least in part on the accelerations or the speeds;
generate a recommendation for a current time for the first user based at least in part on one or more of the-statistics, wherein:
  the recommendation comprises one or more activities at a particular location where at least one of the second users is located at the current time;
  the recommendation corresponds to the inferred activity of the second users; and
  the first user is not associated with the one or more activities at the particular location; and
send the recommendation to the first user.

12. The media of claim 11, wherein the software is further operable when executed to infer one or more accelerations or speeds respectively associated with one or more of the computing devices based at least in part on a plurality of the one or more locations and the corresponding times.

13. The media of claim 11, wherein the software is further operable when executed to categorize the second users based at least in part on demographic information of the second users, wherein:
  the statistics represent the behavioral patterns of the second users in the one or more categories;
  the first user is in the one or more categories from which the statistics are generated; and
  the recommendation corresponds to the behavioral patterns of the second users in the one or more categories.

14. The media of claim 13, wherein the software is further operable when executed to identify the first user based at least in part on information of a social-networking profile associated with the first user, wherein the information suggests that the first user is interested in the inferred activity.

* * * * *